(12) United States Patent
Inoue

(10) Patent No.: US 9,527,525 B2
(45) Date of Patent: Dec. 27, 2016

(54) TRAVEL TRAJECTORY CONTROL DEVICE FOR A VEHICLE

(71) Applicant: Go Inoue, Gotenba (JP)

(72) Inventor: Go Inoue, Gotenba (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 117 days.

(21) Appl. No.: 14/369,010

(22) PCT Filed: Dec. 26, 2012

(86) PCT No.: PCT/JP2012/083598
§ 371 (c)(1),
(2) Date: Jun. 26, 2014

(87) PCT Pub. No.: WO2013/099919
PCT Pub. Date: Jul. 4, 2013

(65) Prior Publication Data
US 2015/0259006 A1  Sep. 17, 2015

(30) Foreign Application Priority Data

Dec. 26, 2011  (JP) ................................. 2011-282729

(51) Int. Cl.
*B62D 6/00* (2006.01)
*B62D 15/02* (2006.01)

(52) U.S. Cl.
CPC ............... *B62D 6/003* (2013.01); *B62D 6/007* (2013.01); *B62D 15/025* (2013.01)

(58) Field of Classification Search
CPC ....... B62D 5/0463; B62D 7/159; B62D 6/008; B62D 6/003; B60T 8/1755
(Continued)

(56) References Cited

U.S. PATENT DOCUMENTS 5,991,675 A * 11/1999 Asanuma ........... B60G 17/0195
  180/422
2006/0095195 A1  5/2006 Nishimura et al.
(Continued)

FOREIGN PATENT DOCUMENTS

DE          44 19 317 A1    12/1994
DE   10 2008 002 669 A1     1/2010
(Continued)

OTHER PUBLICATIONS

International Search Report Issued Apr. 9, 2013 in PCT/JP12/083598 filed Dec. 26, 2012.
(Continued)

*Primary Examiner* — Jelani Smith
(74) *Attorney, Agent, or Firm* — Oblon, McClelland, Maier & Neustadt, L.L.P.

(57) ABSTRACT

Provided is a travel trajectory control device for a vehicle which executes a vehicle travel trajectory control by calculating a target steering angle corresponding to a target steered angle of the front wheels for making a vehicle travel to track a target trajectory, and controlling the steered angle of the front wheels on the basis of the target steered angle with a steered angle varying device and a power steering device. The driving ability of a driver and/or a trajectory change intent thereof are determined. On the basis of a driving ability index value and/or an index value which denotes the intensity of the trajectory change intent of the driver, the tracking of the vehicle to the target trajectory is variably set by variably setting the gain in the travel trajectory control.

12 Claims, 12 Drawing Sheets

(58) Field of Classification Search
USPC .......................................................... 701/41
See application file for complete search history.

(56) References Cited

U.S. PATENT DOCUMENTS

| | | | |
|---|---|---|---|
| 2008/0281486 A1 | 11/2008 | Sakuma | |
| 2009/0024278 A1* | 1/2009 | Kondo ................... | B62D 1/28 701/41 |
| 2011/0015805 A1* | 1/2011 | Seger .................... | B62D 6/007 701/1 |
| 2011/0137488 A1* | 6/2011 | Sakugawa ............. | B60W 30/12 701/1 |
| 2012/0197496 A1 | 8/2012 | Limpibunterng et al. | |
| 2012/0239255 A1 | 9/2012 | Kojima et al. | |
| 2013/0096778 A1 | 4/2013 | Goto et al. | |

FOREIGN PATENT DOCUMENTS

| | | |
|---|---|---|
| DE | 10 2009 022 054 A1 | 11/2010 |
| DE | 10 2011 086 897 A1 | 5/2013 |
| JP | 61-021863 | 1/1986 |
| JP | 11-078948 | 3/1999 |
| JP | 2001-001922 | 1/2001 |
| JP | 2002-211430 | 7/2002 |
| JP | 2006-131055 | 5/2006 |
| JP | 2006-298006 | 11/2006 |
| JP | 2007-210437 | 8/2007 |
| JP | 2008-068669 | 3/2008 |
| JP | 2008-077349 | 4/2008 |
| JP | 2008-120288 | 5/2008 |
| JP | 2008-273465 | 11/2008 |
| JP | 2011-031770 | 2/2011 |
| JP | 2011-079410 | 4/2011 |
| JP | 2011-116288 | 6/2011 |
| JP | 2011-255857 | 12/2011 |
| JP | WO 2011155637 A1 * | 12/2011 ............. B62D 5/008 |

OTHER PUBLICATIONS

Office Action issued Oct. 8, 2015 in German Patent Application No. 11 2012 005 470.9 (submitting English translation only).

* cited by examiner

TRAVEL TRAJECTORY CONTROL DEVICE FOR A VEHICLE

TECHNICAL FIELD

The present invention relates to a travel trajectory control device for a vehicle and, more particularly, to a travel trajectory control device which makes a vehicle travel along a target trajectory (target travel line) by controlling steered angle of steered wheels so that it conforms to a target steered angle.

BACKGROUND ART

Travel control devices for vehicles have already been known which each controls vehicle travel by controlling steered angle of steered wheels so that it conforms to a target steered angle in a vehicle having a steered angle varying device which can vary a relationship of steered angle of steered wheels relative to steering position of a steering input means such as a steering wheel. As a kind of vehicle travel control devices, various travel trajectory control devices for vehicles have been proposed which each calculates a target steered angle of steered wheels for making a vehicle to travel along a target travel line and controls steered angle of the steered wheels so that it conforms to the target steered angle.

For example, in the below-mentioned patent citation 1, a travel trajectory control device is described which is configured to control steered angle of the steered wheels so that it conforms to the target steered angle by cooperative control of a steered angle varying device and a steering assist force generation device so that steered angle of the steered wheels is positively and accurately controlled.

CITATION LIST

Patent Literature 1: Japanese Patent Application Laid-open Publication No. 2011-31770

SUMMARY OF INVENTION

Technical Problem

In a travel trajectory control device, when the tracking of a vehicle to a target trajectory is set high so as to enhance lane keeping performance of the vehicle by a travel trajectory control, steering operation has less influence on steered angle of the steered wheels, which deteriorates overriding performance of the steering operation of a driver. That is, even if a driver conducts steering operation with his or her own will, the vehicle hardly behaviors accordingly, which causes the driver to feel a sense of incongruity and make it difficult for the vehicle to travel in conformity with the driver's wish.

On the contrary, when the tracking of a vehicle to a target trajectory is set low so as to ensure overriding performance of steering operation of a driver, lane keeping performance of the vehicle by a travel trajectory control steering operation is deteriorating, which makes it difficult to make the vehicle travel along a target trajectory.

In particular, when a steered angle of steered wheels is controlled so as to be a target steered angle by cooperative control of a steered angle control device and a steering assist force generation device, steering assist force is also controlled so that a steered angle of steered wheels conforms to a target steered angle. Consequently, the above-mentioned problem is notable particularly in a situation where a steered angle of steered wheels is controlled so as to be a target steered angle by cooperative control of a steered angle control device and a steering assist force generation device.

Since a driver having the high driving ability conducts steering operation so that a vehicle travel appropriately along a lane, control amount of steered angle of steered wheels may be small which is required for a vehicle to travel along a lane. Accordingly, the tracking of the vehicle to the target trajectory may not be set high.

On the contrary, since a driver having the low driving ability cannot always conduct steering operation so that a vehicle travel appropriately along a lane, control amount of steered angle of steered wheels may be large which is required for a vehicle to travel along a lane. Accordingly, the tracking of the vehicle to the target trajectory must be set high.

In a conventional travel trajectory control device, however, the tracking of a vehicle to a target trajectory is constant, which makes it unable to solve the problem caused by variations in demand of overriding performance of steering operation of a driver and driving ability of a driver The present invention has been accomplished in view of the above-mentioned problems in the conventional travel trajectory control device in which a target steered angle of steered wheels is calculated which makes a vehicle travel along a target travel line and steered angle of the steered wheels is controlled so that it conforms to the target steered angle. A primary object of the present invention is to make a vehicle travel along a target travel line without making a driver feel a sense of congruity in spite of variations in demand of overriding performance of steering operation of a driver and driving ability of a driver which differs depending on a driver.

The present invention provides a travel trajectory control device for a vehicle which executes a vehicle travel trajectory control by calculating a target steered angle of steered wheels for making a vehicle travel to track a target trajectory, and controlling the steered angle of the steered wheels on the basis of the target steered angle with a steered angle varying means, wherein at least one of driving ability of a driver and trajectory change intent thereof are determined and the tracking of the vehicle to the target trajectory is variably set on the basis of the determination result.

According to the above-described configuration, at least one of driving ability of a driver and trajectory change intent thereof is determined and the tracking of the vehicle to the target trajectory is variably set on the basis of the determination result. Accordingly, the tracking of the vehicle to the target trajectory can variably be set on the basis of at least one of driving ability of a driver and trajectory change intent thereof. Therefore, a vehicle travel trajectory control can more appropriately be carried out regardless of driving ability of a driver and trajectory change intent thereof as compared to where the control is carried out by a conventional travel trajectory control device in which the tracking of the vehicle to a target trajectory is constant.

The above-mentioned configuration may be such that: when the driver has the high driving ability, the tracking of the vehicle to the target trajectory is set lower as compared to where the driver has the low driving ability.

According to this configuration, when the driver has the high driving ability, the tracking of the vehicle to the target trajectory is set lower as compared to where the driver has the low driving ability, which enables steered angle of the steered wheels to more preferably reflect steering operation of the driver when the driver has the high driving ability.

Consequently, overriding performance of steering operation of a driver having the high driving ability can be enhanced while preventing overriding performance of steering operation of a driver having the low driving ability from unduly increasing.

The above-mentioned configuration may be such that: driving ability of the driver is determined on the basis of the change rate of a difference between an actual travel parameter reflecting the steering operation of the driver and a target travel parameter for making the vehicle travel to track the target trajectory.

In general, when a driver has the high driving ability, an actual travel parameter which reflects steering operation of the driver is close to a target travel parameter for the vehicle to track a target trajectory and, accordingly, the change rate of a difference between the parameters is small. By contrast, when a driver has the low driving ability, an actual travel parameter which reflects steering operation of the driver tends to deviate from a target travel parameter for the vehicle to track a target trajectory, resulting in that the change rate of a difference between the parameters tends to be large.

According to the above configuration, driving ability of the driver is determined on the basis of the change rate of a difference between an actual travel parameter reflecting the steering operation of the driver and a target travel parameter for making the vehicle travel to track the target trajectory, which enables to preferably conduct determination as to whether or not driving ability of the driver is high.

The above-mentioned configuration may be such that: when the driver has an intensive trajectory change intent, the tracking of the vehicle to the target trajectory is set lower as compared to where the driver has a weak trajectory change intent.

According to this configuration, when the driver has an intensive trajectory change intent, the tracking of the vehicle to the target trajectory is set lower as compared to where the driver has a weak trajectory change intent, which enables steered angle of the steered wheels to more preferably reflect steering operation of the driver when the driver has an intensive trajectory change intent. Consequently, overriding performance of the steering operation of a driver having an intensive trajectory change intent can be enhanced while preventing overriding performance of the steering operation of a driver having a weak trajectory change intent from unduly increasing.

The above-mentioned configuration may be such that: determination as to whether or not the driver has a trajectory change intent is made on the basis of duration time for which the magnitude of a difference between an actual travel parameter reflecting the steering operation of the driver and a target travel parameter for making the vehicle travel to track the target trajectory is not less than a reference value.

In general, when a driver intends to change travel trajectory of a vehicle, a difference between an actual travel parameter which reflects steering operation of the driver and a target travel parameter for the vehicle to track a target trajectory increases in magnitude and duration time of such situation increases.

According to the above configuration, determination as to whether or not the driver has a trajectory change intent is made on the basis of duration time for which the magnitude of a difference between the above-mentioned travel parameters is not less than a reference value, which enables to preferably conduct determination as to whether or not the driver has a trajectory change intent.

The above-mentioned configuration may be such that: the intensity of the trajectory change intent of the driver is determined on the basis of a product of the magnitude of the difference and the duration time in a situation where the determination is made that the driver has a trajectory change intent.

In general, as the intensity of the trajectory change intent of the driver increases, a difference between an actual travel parameter which reflects steering operation of the driver and a target travel parameter for the vehicle to track a target trajectory increases in magnitude and duration time of such situation increases.

According to this configuration, the intensity of the trajectory change intent of the driver is determined on the basis of a product of the magnitude of the difference between the above-mentioned travel parameters and the duration time, which enables to preferably determine the intensity of the trajectory change intent of the driver.

The above-mentioned configuration may be such that: the travel trajectory control device estimates at least one of travel trajectory parameters which are lateral position of the vehicle relative to a lane, curvature radius of the lane and yaw angle of the vehicle relative to the lane on the basis of information of the lane; the travel trajectory control device calculates a target steered angle of the steered wheels on the basis of at least one of travel trajectory parameters; and the travel trajectory parameters include at least one of lateral position of the vehicle, yaw angle of the vehicle and steered angle of the steered wheels.

According to this configuration, determination as to whether or not the driver has a trajectory change intent and/or intensity of the trajectory change intent of the driver can be conducted on the basis of a difference between an actual value and a target value of at least one of lateral position of the vehicle, yaw angle of the vehicle and steered angle of the steered wheels.

The above-mentioned configuration may be such that: the driving ability of the driver is determined on the basis of a weighted sum of a first driving ability determination value based on change rate of a difference of lateral positions of the vehicle and a second driving ability determination value based on change rate of a difference of yaw angles of the vehicle and when curvature radius of the lane is large, the weight of the first driving ability determination value is increased as compared to where curvature radius of the lane is small.

According to this configuration, the driving ability of the driver can be determined on the basis of a weighted sum of a first driving ability determination value based on change rate of a difference of lateral positions of the vehicle and a second driving ability determination value based on change rate of a difference of yaw angles of the vehicle. In addition, when curvature radius of the lane is large, the weight of the first driving ability determination value is increased as compared to where curvature radius of the lane is small, which enables to preferably determine the driving ability of the driver regardless of the magnitude of curvature radius of the lane.

The above-mentioned configuration may be such that: a target travel parameter is utilized from which the influence of the travel trajectory control is eliminated.

According to this configuration, a target travel parameter is utilized from which the influence of the travel trajectory control is eliminated. Consequently, it is possible to preferably conduct determination as to whether or not the driver has a trajectory change intent without being affected by the travel trajectory control and to preferably determine the intensity of the trajectory change intent of the driver without being affected by the travel trajectory control.

The above-mentioned configuration may be such that: when a vehicle speed is high, change rate in changing the tracking of the vehicle is decreased as compared to where a vehicle speed is low.

According to this configuration, when vehicle speed is high, the possibility can effectively be reduced that vehicle travel stability is aggravated due to rapid change in the tracking of the vehicle to the target trajectory while moderately changing the tracking of the vehicle when a vehicle speed is low.

The above-mentioned configuration may be such that: the travel trajectory control device has a control mode in which the travel trajectory control is executed and a non-control mode in which the travel trajectory control is not executed; the travel trajectory control device calculates a target steered angle of the steered wheels as well in the non-control mode; and the difference includes a difference between the target steered angle of the steered wheels and an actual steered angle of the steered wheels.

According to this configuration, determination as to whether or not the driving ability of the driver is high can preferably be conducted as well in the non-control mode on the basis of the difference between the target steered angle of the steered wheels and an actual steered angle of the steered wheels.

The above-mentioned configuration may be such that: in the non-control mode, the driving ability of the driver is determined on the basis of a weighted sum of a third driving ability determination value based on a difference of steered angles and a fourth driving ability determination value based on a phase difference between the target steered angle of the steered wheels and an actual steered angle of the steered wheels and when the curvature radius of the lane is large, the weight of the third driving ability determination value is increased as compared to where the curvature radius of the lane is small.

According to this configuration, the driving ability of the driver can be determined on the basis of a weighted sum of a third driving ability determination value based on a difference of steered angles and a fourth driving ability determination value based on a phase difference between the target steered angle of the steered wheels and an actual steered angle of the steered wheels. In addition, when the curvature radius of the lane is large, the weight of the third driving ability determination value is increased as compared to where the curvature radius of the lane is small, which enables to preferably determine the driving ability of the driver regardless of the magnitude of the curvature radius of the lane.

The above-mentioned configuration may be such that: wherein the steered angle varying means can vary the responsiveness in varying steered angle of the steered wheels in response to steering operation of the driver and, in the non-control mode, the travel trajectory control device variably sets the responsiveness of the steered angle varying means in accordance with the determination result of the driving ability of the driver.

According to this configuration, in the non-control mode, the responsiveness of the steered angle varying means is variably set in accordance with the determination result of the driving ability of the driver, which enables to vary the responsiveness in varying the steered angle of the steered wheels in response to steering operation of the driver in accordance with the driving ability of the driver.

The above-mentioned configuration may be such that: the responsiveness of the steered angle varying means which corresponds to the tracking of the vehicle is stored when the mode is changed from the control mode to the non-control mode and when the vehicle continues to travel in the non-control mode, the responsiveness of the steered angle varying means is controlled on the basis of the stored responsiveness.

According to this configuration, the responsiveness of the steered angle varying means which corresponds to the tracking of the vehicle is stored when the mode is changed from the control mode to the non-control mode and when the vehicle continues to travel in the non-control mode, the responsiveness of the steered angle varying means is controlled on the basis of the stored responsiveness. Consequently, after the mode was changed from the control mode to the non-control mode, the responsiveness of the steered angle varying means can be controlled on the basis of the responsiveness which corresponds to the tracking of the vehicle at the time when the mode was changed.

The above-mentioned configuration may be such that: the travel trajectory control device stores the responsiveness of the steered angle varying means when the vehicle finishes traveling in the non-control mode and controls the responsiveness of the steered angle varying means on the basis of the stored responsiveness when the vehicle starts traveling in the non-control mode.

According to this configuration, when the vehicle finishes traveling in the non-control mode, the responsiveness of the steered angle varying means is stored and when the vehicle starts traveling in the non-control mode, the responsiveness of the steered angle varying means is set on the basis of the stored responsiveness. Accordingly, the possibility can be reduced that the driver feels a sense of congruity about the responsiveness of the steered angle varying means when the vehicle restarts traveling.

The above-mentioned configuration may be such that: the driving ability of the driver is determined on the basis of an integrated value for a unit time or unit travel distance of change rates of differences between an actual travel parameter reflecting the steering operation of the driver and a target travel parameter for making the vehicle travel to track the target trajectory.

The above-mentioned configuration may be such that: the intensity of the trajectory change intent of the driver is determined on the basis of an integrated value for a unit time or unit travel distance of products of the magnitudes of the differences and the duration time in a situation where the determination is made that the driver has trajectory change intent.

The above-mentioned configuration may be such that: a target travel parameter from which the influence of the travel trajectory control is eliminated is calculated on the basis of a target steered angle of the steered wheels utilizing a vehicle model.

The above-mentioned configuration may be such that: the steered angle varying means controls steered angle of the steered wheels so as to be a target steered angle by the cooperative control with a steering assist force generation means.

DESCRIPTION OF EMBODIMENTS

Some preferred embodiments of the present invention will be described in detail with reference to the accompanying drawings.

First Embodiment

Figure 1:
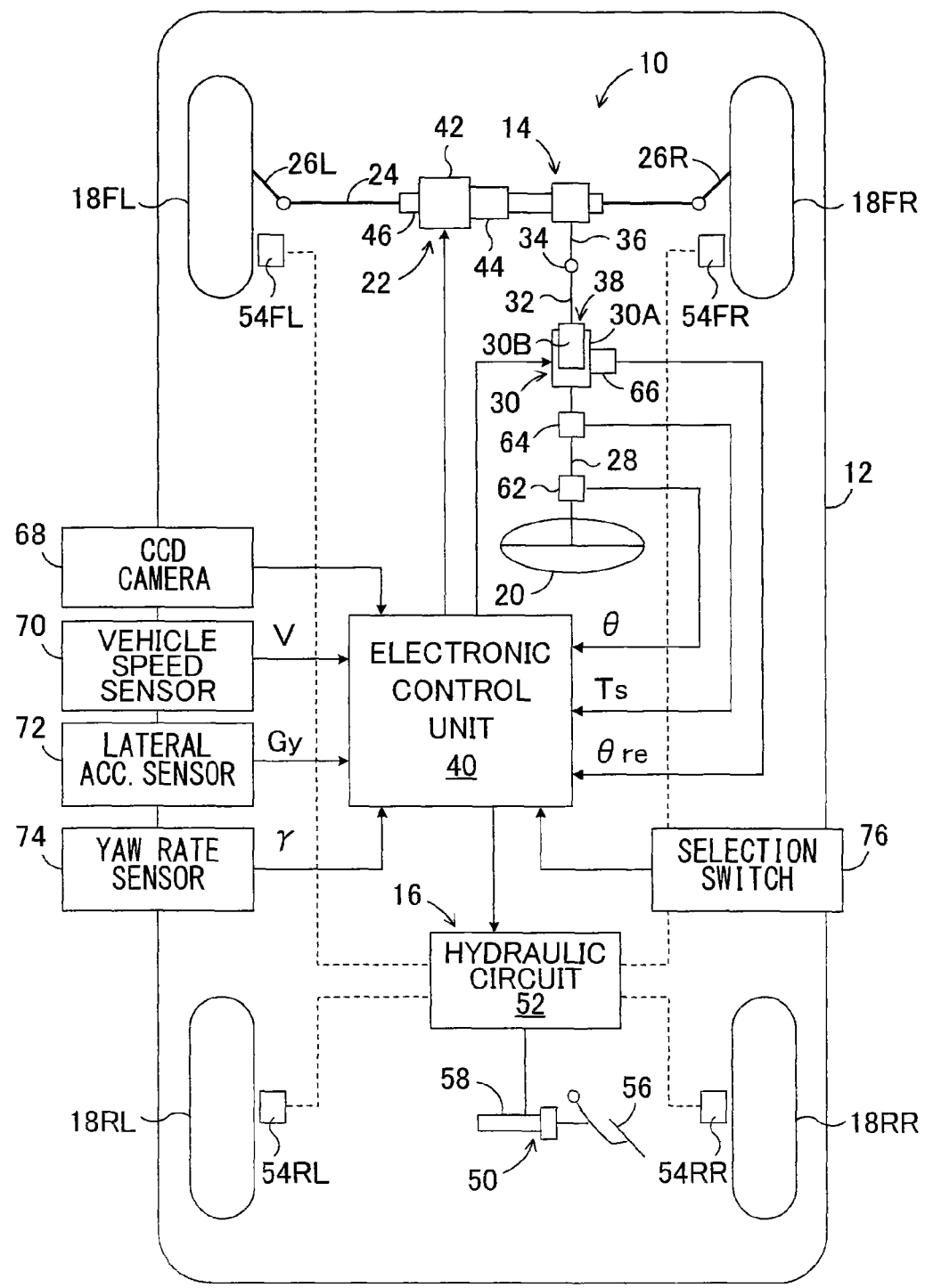
FIG. 1 is a schematic configurational view showing a first embodiment of a vehicle travel trajectory control device according to the present invention.

FIG. 1 is a schematic configurational view showing a first embodiment of a vehicle travel trajectory control device according to the present invention.

Referring to FIG. 1, a vehicle travel track control device 10 is installed in a vehicle 12 and includes a front wheel steering control device 14. The front wheel steering control device 14 serves as a steered angle control means which is capable of controlling steered angle of tfront wheels irrespective of steering operation of a driver. The vehicle 12 is equipped with a braking force control device 16 which is capable of individually controlling braking force of each wheel regardless of braking operation of the driver.

In FIG. 1, reference numerals 18FL and 18FR respectively denote left and right front wheels, which are steered wheels; and 18RL and 18RR respectively denote left and right rear wheels. The right and left front wheels 18FR, 18FL, which are steered wheels, are steered by a power steering device 22 of a rack and pinion type via a rack bar 24 and tie rods 26L and 26R, respectively, the power steering device being actuated in response to the operation of a steering wheel 20 by a driver.

The steering wheel 20 is drivingly connected to a pinion shaft 36 of the power steering device 22 via an upper steering shaft 28, a steered angle varying device 30, a lower steering shaft 32, and a universal joint 34. In the first embodiment shown in the figure, the steered angle varying device 30 includes an electric motor 38 for supplementary steering driving. The electric motor 38 has a housing 30A linked to a lower end of the upper steering shaft 28 and a rotor 30B linked to an upper end of the lower steering shaft 32.

As is apparent from the above, the steered angle varying device 30 rotates the lower steering shaft 32 relative to the upper steering shaft 28 so as to drive, for supplementary steering, the left and right front wheels 18FL and 18FR relative to the steering wheel 20. The steered angle varying device 30 is controlled by a steering control section of an electronic control unit 40.

The power steering device 22 is an electric power steering device located concentric with the rack bar. The power steering device 22 includes an electric motor 42 and a mechanism that converts the rotational torque of the electric motor 42 into a force in a reciprocating direction of the rack bar 24 such as, for example, a ball-screw type converting mechanism 44. The power steering device 22 is controlled by a steering assist torque control section of the electronic control unit 40 and generates steering assist torque to drive the rack bar 24 relative to a housing 46. The steering assist torque reduces steering load on the driver and as necessary assists steering actuation of the left and right front wheels by the steered angle varying device 30.

As is understood from the above, the steered angle varying device 30 constitutes a main part of the front wheel steering control device 14 which cooperates with the power steering device 22 to change the relationship of the steered angle of the left and right front wheels relative to the steering wheel 20 and steers the front wheels irrespective of steering operation of a driver.

It is to be noted that since the configurations of the power steering device 22 and the steered angle varying device 30 do not constitute the gist of the present invention, these devices may be of any configuration known in the art so long as they perform the above-mentioned functions.

The braking force control device 16 includes a braking apparatus 50. Braking forces of the wheels are controlled through control of the internal pressures Pi (i=fl, fr, rl and rr) of respective wheel cylinders 54FL, 54FR, 54RL and 54RR, i.e. brake pressures by a hydraulic circuit 52 of the braking apparatus 50. Although not shown in FIG. 1, the hydraulic circuit 52 includes a reservoir, an oil pump, various valve units and the like. Brake pressure in each wheel cylinder is usually controlled by pressure in a master cylinder 58 driven by the driver's operation of depressing a brake pedal 56. Brake pressure in each wheel cylinder is also individually controlled as necessary by means of the hydraulic circuit 52 being controlled by a braking force control section of the electronic control unit 40. Thus, the braking apparatus 50 is capable of individually controlling braking force of each wheel irrespective of braking operation of the driver and serves as a main device of the braking force control device 16.

The upper steering shaft 28 is provided with a steering angle sensor 62 which detects a rotational angle of the upper steering shaft 28 as a steering angle θ and a steering torque sensor 64 which detects a steering torque Ts. Signals indicative of a steering angle θ and a steering torque Ts are input to the electronic control unit 40. The electronic control unit 40 receives a signal indicative of a relative rotation angle ere of the steered angle varying device 30 detected by a rotation angle sensor 66, which is a rotation angle of the lower steering shaft 32 relative to the upper steering shaft 28.

In the embodiment shown in the figure, a CCD camera 68 which captures a forward image ahead of the vehicle 12 is provided at a front part of a cabin of the vehicle 12, and a signal indicative of the forward image information ahead of the vehicle 12 is input to the electronic control unit 40 from the CCD camera 68. The electronic control unit 40 additionally receives a signal indicative of a vehicle speed V detected by a vehicle speed sensor 70, a signal indicating a lateral acceleration Gy detected by a lateral acceleration sensor 72 and a signal indicating a yaw rate γ detected by a yaw rate sensor 74.

The vehicle 12 Is provided with a selection switch 76 which is used to select whether or not a travel track control, being referred to a lane keeping assist control (LKA control), is executed. A signal indicative of the selected position of the selection switch 76 is input to the electronic control unit 40. The electronic control unit 40 further receives signals indicative of a master cylinder pressure Pm detected by a pressure sensor not shown in FIG. 1 and the likes.

The individual sections of the electronic control unit 40 may be those which comprise microcomputers and each microcomputer may have CPU, ROM, RAM and an input/output port connected with one another via a bidirectional common bus. The steering angle sensor 62, the steering torque sensor 64 and the rotation angle sensor 66 detect a steering angle θ, a steering torque Ts and a relative rotation angle θre, respectively, with the detected variables being positive when steering or vehicle turning is conducted in left turning direction of the vehicle.

Figure 2:
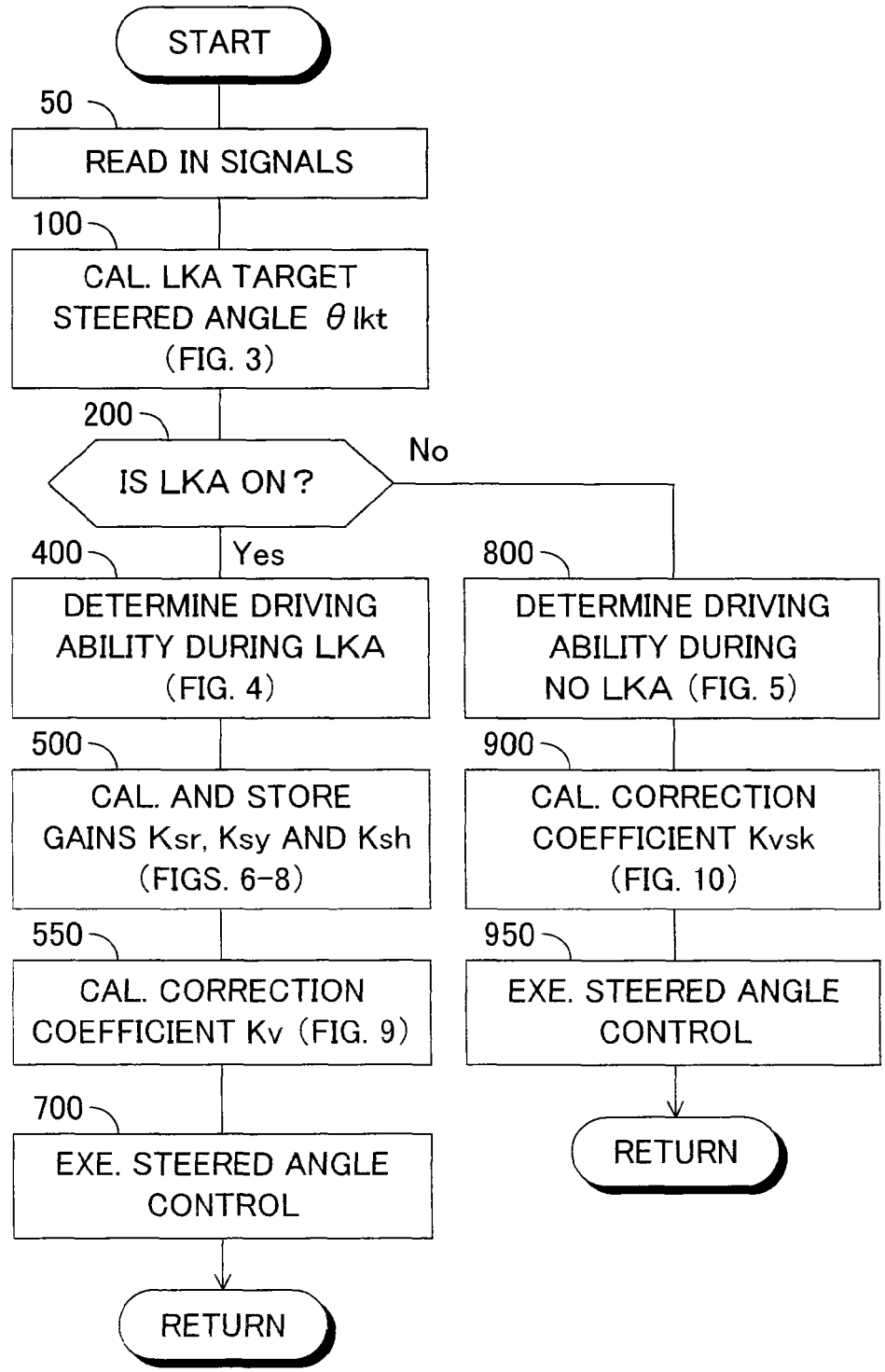
FIG. 2 is a flowchart showing a control routine of the steered angle of the front wheels in the first embodiment.

In a situation where the selection switch 76 is ON, the steering control section of the electronic control unit 40 executes a travel track control on the basis of the forward image information ahead of the vehicle 12 acquired by the CCD camera 68 in accordance with the flowchart shown in FIG. 2. That is, the steering control section determines a lane on the basis of the forward image information ahead of the vehicle 12 acquired by the CCD camera 68 and calculates a target steered angle δt of the front wheels for making the vehicle 12 travel along the lane. Further, the steering control section calculates a target pinion angle φt which corresponds to a target steered angle δt of the right and left front wheels for making the vehicle 12 travel along the lane and controls the steered angle varying device 30 so that the angle of the pinion 36 conforms to the target pinion angle φt.

It is to be understood that the steering control section of the electronic control unit 40 estimates a lateral difference of the vehicle relative to a lane, a yaw angle of the vehicle relative to the lane and a curvature radius of the lane, and calculates a target steered angle of the steered wheels on the basis of the estimated parameters.

Figure 4:
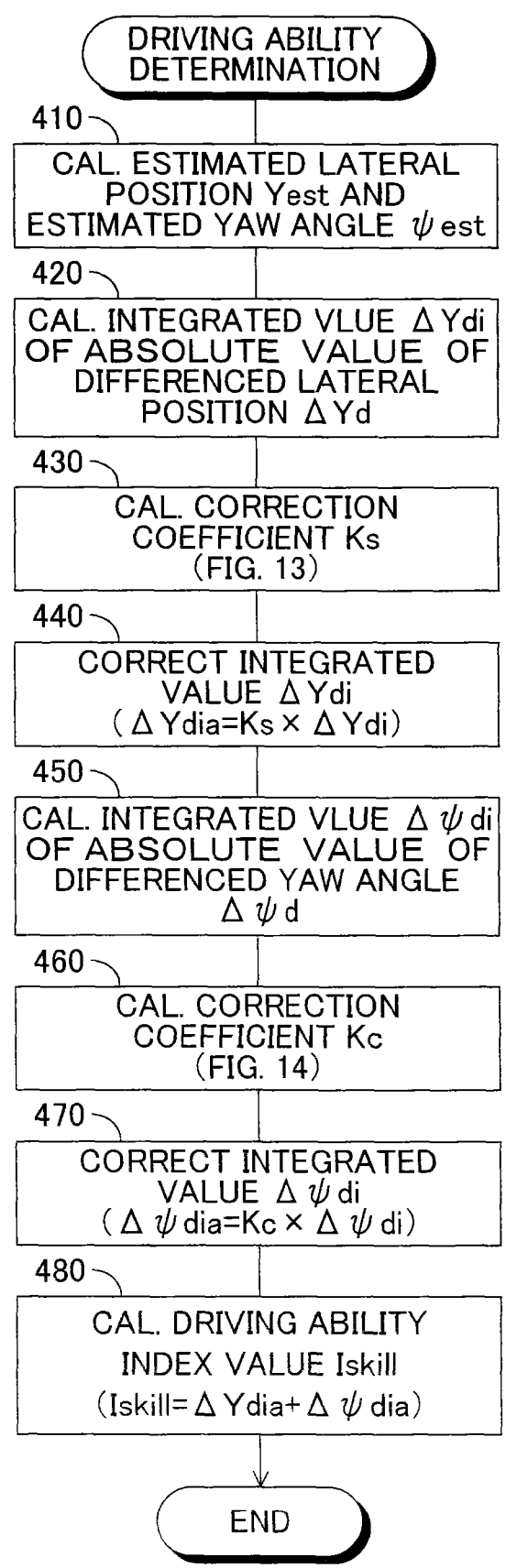
FIG. 4 is a flowchart showing a routine for calculating a driving ability index value Iskill of the driver during the LKA control being executed which is conducted in step 400 shown in FIG. 2.

When the steering control section of the electronic control unit 40 executes a travel trajectory control, it determines the driving ability of the driver in accordance with the flowchart shown in FIG. 4 and variably sets the tracking of the vehicle to the target trajectory on the basis of the determination result.

Figure 5:
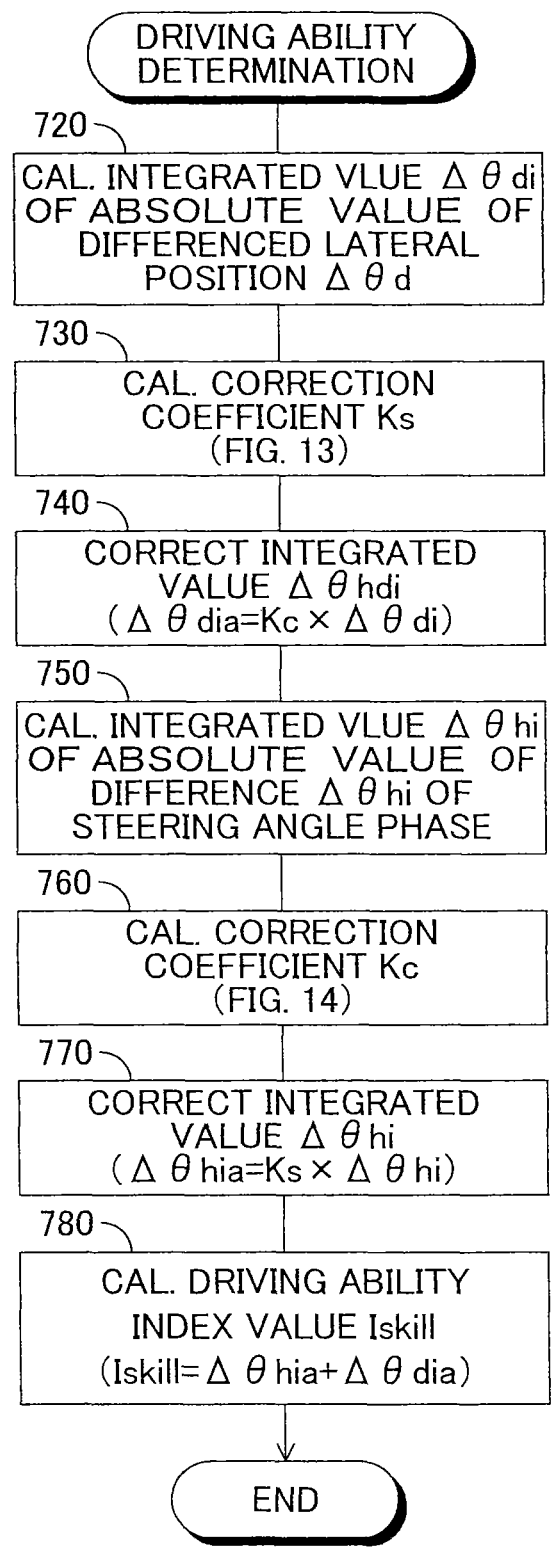
FIG. 5 is a flowchart showing a routine for calculating a driving ability index value Iskill of the driver during no LKA control being executed which is conducted in step 700 shown in FIG. 2.

Even when the steering control section of the electronic control unit 40 does not execute a travel trajectory control, it determines driving ability of the driver in accordance with the flowchart shown in FIG. 5 and variably sets the steering gear ratio during non-travel trajectory control on the basis of the determination result.

Next, referring to the flowchart shown in FIG. 2, a control routine of the steered angle of the front wheels in the first embodiment will be explained. It is to be noted that the control in accordance with the flowchart shown in FIG. 2 is started when an ignition switch not shown in the figures is turned on, and is repeatedly executed at predetermined intervals.

First, in step 50, read in are a signal indicative of a steering angle θ detected by the steering angle sensor 62 and the like. In step 100, a target steered angle θlkt of the LKA control is calculated in accordance with the flowchart shown in FIG. 3.

In step 200, a decision is made as to whether or not the selection switch 76 is ON and the LKA control is being executed. When a negative decision is made, the control proceeds to step 800, while when an affirmative decision is made, the control proceeds to step 400.

In step 400, driving ability of a driver during the LKA control being executed is determined in accordance with the flowchart shown in FIG. 4 and a driving ability index value Iskill which indicates the driving ability of the driver is calculated.

Figure 6:
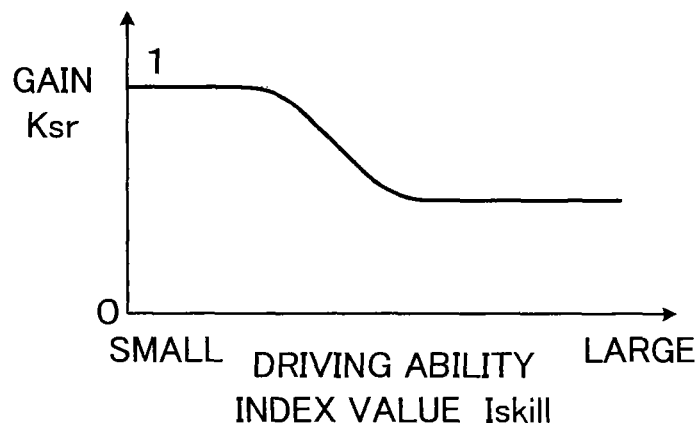
FIG. 6 is a map for calculating a gain Ksr on the basis of the driving ability index value Iskill.
Figure 7:
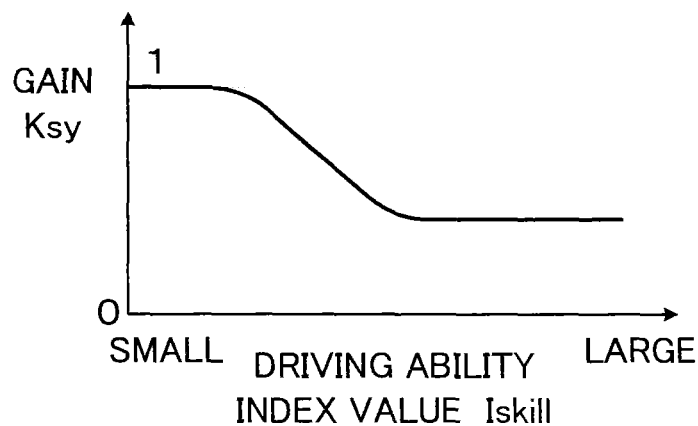
FIG. 7 is a map for calculating a gain Ksy on the basis of the driving ability index value Iskill.
Figure 8:
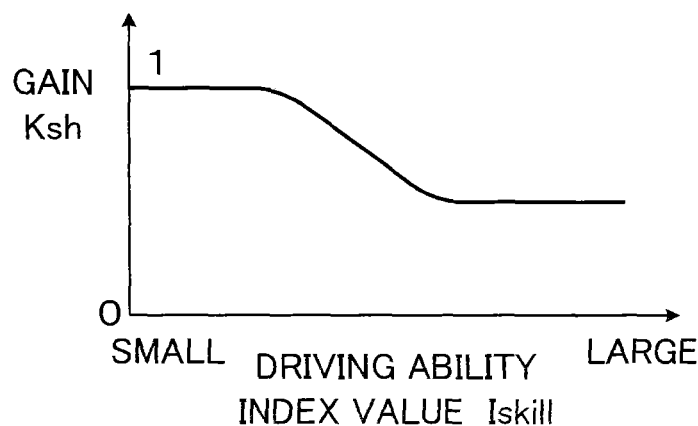
FIG. 8 is a map for calculating a gain Ksh on the basis of the driving ability index value Iskill.

In step 500, gains Ksr, Ksy and Ksh are calculated from the maps shown in FIGS. 6-8 on the basis of the driving ability index value Iskill and are stored in EEPROM. As shown in FIGS. 6-8, the gains Ksr, Ksy and Ksh are calculated as 1 when the driving ability index value Iskill is small but are calculated so that they gradually decrease within the positive range as the driving ability index value Iskill increase.

Figure 9:
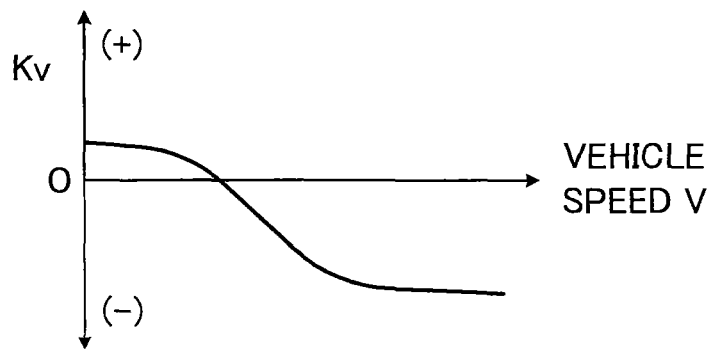
FIG. 9 is a map for calculating a map for calculating a correction coefficient Kv on the basis of a vehicle speed V.

In step 550, a correction coefficient Kv based on vehicle speed is calculated from the map shown in FIG. 9 on the basis of a vehicle speed V. As shown in FIG. 9, the correction coefficient Kv is calculated so that it assumes 1 in an area where a vehicle speed V is low; it gradually decreases as a vehicle speed V increases; and it assumes a negative value in an area where a vehicle speed V is high.

In step 700, a target pinion angle φlkt which is a target angle of the pinion 36 corresponding to a target steered angle δt of the front wheels is calculated on the basis of steering angle (θ−θlkt) modified by the target steered angle θlkt in accordance with the following Formula 1.

$$\phi lkt = Kv(\theta - \theta lkt) \tag{1}$$

Again in step 700, with a parameter being φt which is used to prevent the front wheels from being unduly steered by the steered angle varying device 30 in a situation where steering input is given, the steered angle varying device 30 is controlled so that pinion angle φ conforms to a final target pinion angle φlkt+φt, resulting in that the steered angle of the left and right front wheels is controlled so as to be a target steered angle δt which corresponds to the target pinion angle φlkt.

In step 800, driving ability of the driver during no LKA control being executed is determined in accordance with the flowchart shown in FIG. 5 and a driving ability index value Iskill which indicates the driving ability of the driver is calculated.

Figure 10:
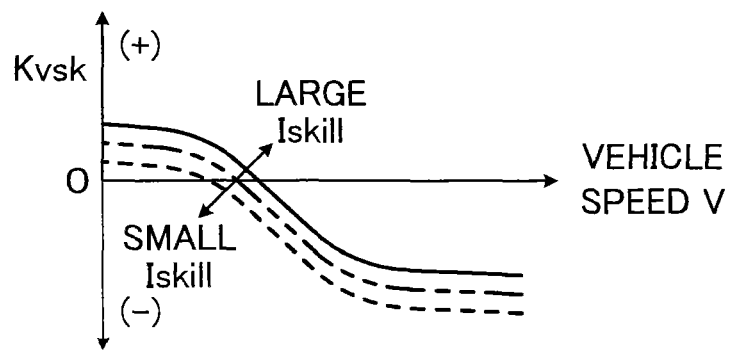
FIG. 10 is a map for calculating a correction coefficient Kvsk on the basis of a vehicle speed V and the driving ability index value Iskill.

In step 900, a correction coefficient Kvsk is calculated from the map shown in FIG. 10 on the basis of a vehicle speed V and the driving ability index value Iskill. As shown in FIG. 10, the correction coefficient Kvsk is calculated so that it assumes a positive value in areas where a vehicle speed V is low; it gradually decreases as a vehicle speed V increases; and it assumes a negative value in areas where a vehicle speed V is high. In addition, the correction coefficient Kvsk is calculated so that it increases as the driving ability index value Iskill increase.

In step 950, a target pinion angle φnt which is a target angle of the pinion 36 corresponding to a target steered angle δt of the front wheels is calculated on the basis of steering angle θ in accordance with the following Formula 2.

$$\varphi nt = Kvsk \times \theta \qquad (2)$$

Again in step 950, the steered angle varying device 30 is controlled so that pinion angle 9 conforms to a final target pinion angle φlkt+φt, resulting in that the steered angle of the left and right front wheels is controlled so as to be a target steered angle δt which corresponds to the target pinion angle φnt.

Next, referring to the flowchart shown in FIG. 3, will be explained a routine for calculating a target steered angle θlkt of the LKA control which is conducted in the above-mentioned step 100.

In step 110, white lines of the lane are specified on the basis of the captured forward image information ahead of the vehicle 12 obtained by the CCD camera 68, and curvature radiuses Rsl and Rsr of left and right white lines are calculated. Further, curvature radius Rs of the lane is calculated as an average value of the curvature radiuses Rsl and Rsr.

In step 120, lateral position Ys of the vehicle relative to a reference position of the lane (the distance in the vehicle lateral direction between a reference position of the lane and a gravity center of the vehicle) is calculated. It is to be noted that reference position may be left white line, right white line or the center between left and right white lines.

In step 130, yaw angle φs of the vehicle relative to the lane is calculated by, for example, calculating an angle which longitudinal direction of the vehicle forms with phantom line passing through the center of the lane.

In step 140, a target yaw angle φst of the vehicle is calculated as a very small value which has the same sign as the curvature radius Rs of the lane calculated in step 110 and increases in magnitude as the radius Rs increases in magnitude.

In step 150, a target lateral acceleration Gyts of the vehicle for making the vehicle travel along a target trajectory passing through the center of the lane is calculated in accordance with the following Formula 3 utilizing gains Ksr, Ksy and Ksh which are stored in EEPROM in step 500.

$$Gyts = Ksr \times Rs + Ksy(Yst - Ys) + Ksh(\varphi st - \varphi s) \qquad (3)$$

Figure 11:
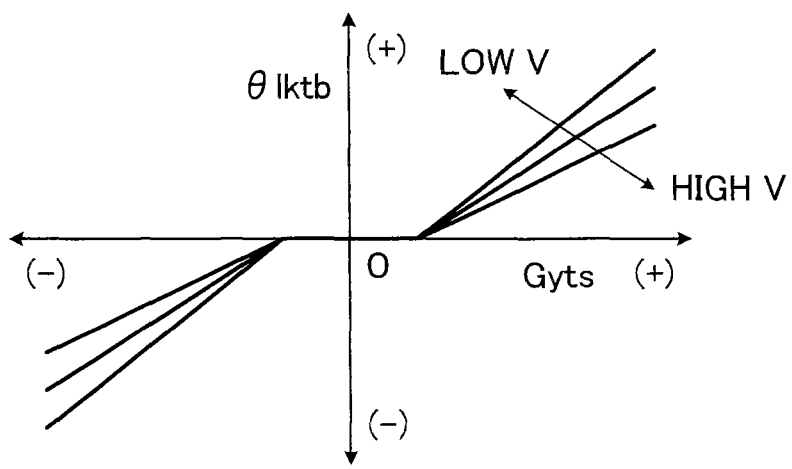
FIG. 11 is a map for calculating a basic target steering angle θlktb of the LKA control on the basis of the target lateral acceleration Gyts of the vehicle and a vehicle speed V.

In step 170, a basic target steering angle θlktb of the LKA control is calculated from a map shown in FIG. 11 on the basis of the target lateral acceleration Gyts of the vehicle and a vehicle speed V.

Figure 12:
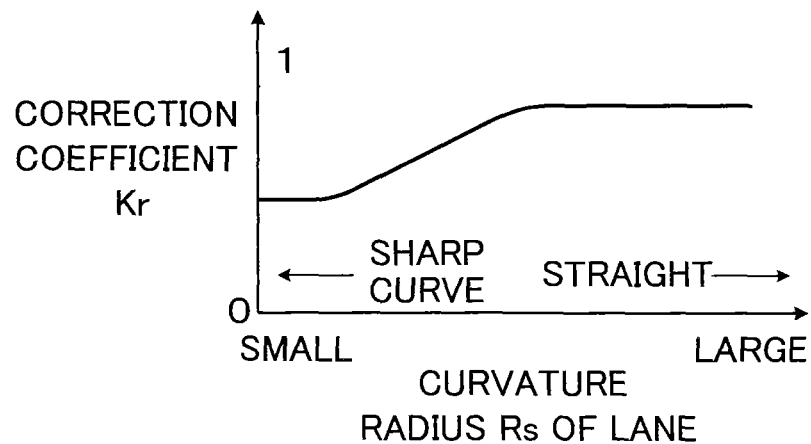
FIG. 12 is a map for calculating a correction coefficient Kr on the basis of the curvature radius Rs of the lane.

In step 180, a correction coefficient Kr based on the curvature radius of the lane is calculated from a map shown in FIG. 12 on the basis of the curvature radius Rs of the lane calculated in step 110. As shown in FIG. 12, correction coefficient Kr is calculated as a value which is larger than 0 and smaller than 1 so that it increases as the curvature radius Rs of the lane increases.

In step 190, a target steered angle θlkt of the LKA control is calculated as a product of the correction coefficient Kr and the basic target steering angle θlktb in accordance with the following Formula 4.

$$\theta lkt = Kr \times \theta lktb \qquad (4)$$

Next, referring to the flowchart shown in FIG. 4, will be explained a routine for calculating a driving ability index value Iskill of the driver during the LKA control being executed which is conducted in the above-mentioned step 400.

In step 410, estimated lateral position Yest of the vehicle relative to the reference position of the lane and estimated yaw angle φest of the vehicle relative to the lane are calculated on the basis of the target steered angle θlkt utilizing a vehicle model stored in ROM.

In step 420, a differential value ΔYd of the difference between lateral position Ys of the vehicle and estimated lateral position Yest of the vehicle is calculated, and an integrated value ΔYdi of the absolute values of the differential values for a unit time or unit travel distance is calculated.

Figure 13:
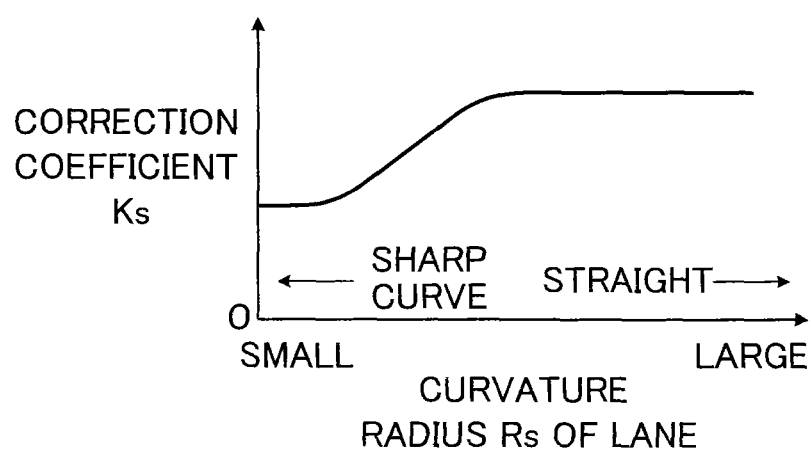
FIG. 13 is a map for calculating a correction coefficient Ks on the basis of the curvature radius Rs of the lane.

In step 430, a correction coefficient Ks based on the curvature radius of the lane is calculated from a map shown in FIG. 13 on the basis of the curvature radius Rs of the lane calculated in step 110. As shown in FIG. 13, th correction coefficient Ks is calculated so that it increases as curvature radius Rs of the lane increases.

In step 440, a corrected integrated value ΔYdia of the absolute values of the differential values of the lateral position differences of the vehicle is calculated as a product of the correction coefficient Ks and the integrated value ΔYdi in accordance with the following Formula 5.

$$\Delta Ydia = Ks \times \Delta Ydia \qquad (5)$$

In step 450, a differential value Δφpd of the difference between yaw angle φs of the vehicle and estimated yaw angle φest of the vehicle is calculated, and an integrated value Δφdi of the absolute values of the differential values for a unit time or unit travel distance is calculated.

Figure 14:
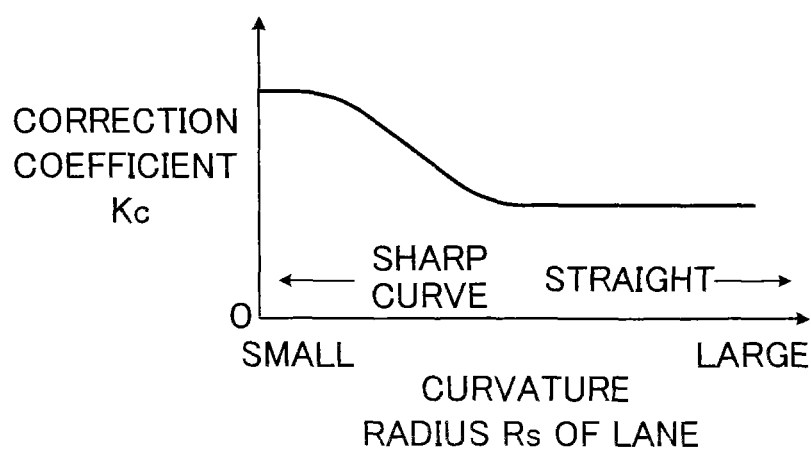
FIG. 14 is a map for calculating a correction coefficient Kc on the basis of the curvature radius Rs of the lane.

In step 460, a correction coefficient Kc based on the curvature radius of the lane is calculated from a map shown in FIG. 14 on the basis of the curvature radius Rs of the lane calculated in step 110. As shown in FIG. 14, the correction coefficient Kc is calculated so that it decreases as the curvature radius Rs of the lane increases.

In step 470, a corrected integrated value Δφdia of the absolute values of the differential value of the yaw angle differences of the vehicle is calculated as a product of the correction coefficient Kc and the integrated value Δφdi in accordance with the following Formula 6.

$$\Delta \varphi dia = Kc \times \Delta \varphi dia \qquad (6)$$

In step 480, a driving ability index value Iskill of the driver is calculated as a sum of the corrected integrated value ΔYdia of the absolute values of the differential values of the lateral position differences of the vehicle and the corrected integrated value Δφdia of the absolute values of the differential values of the yaw angle differences of the vehicle in accordance with the following Formula 7.

$$Iskill = \Delta Ydia + \Delta \varphi dia \qquad (7)$$

Next, referring to the flowchart shown in FIG. 5, will be explained a routine for calculating a driving ability index value Iskill of the driver during no LKA control being executed which is conducted in the above-mentioned step 700.

In step 720, a differential value Δθd of the difference between a target steering angle θlkt of the vehicle travel trajectory control and an actual steering angle θ is calculated, and an integrated value Δθdi of the absolute values of the differential values for a unit time or unit travel distance is calculated.

In step 730, as in step 430, a correction coefficient Ks based on the curvature radius of the lane is calculated from a map shown in FIG. 13 on the basis of the curvature radius Rs of the lane calculated in step 110.

In step 740, a corrected integrated value Δθdia of the absolute values of the differential values of the steering angle differences is calculated as a product of the correction coefficient Ks and the integrated value Δθdi in accordance with the following Formula 8.

$$\Delta\theta dia = Ks \times \Delta\theta dia \quad (8)$$

In step 750, a phase difference Δθh between a target steering angle θlkt of the vehicle travel trajectory control and an actual steering angle θ is calculated, and an integrated value Δθhi of the absolute values of the phase differences for a unit time or unit travel distance is calculated.

In step 760, as in step 460, a correction coefficient Kc based on th curvature radius of the lane is calculated from a map shown in FIG. 14 on the basis of the curvature radius Rs of the lane calculated in step 110.

In step 770, a corrected integrated value Δθhia of the absolute values of the differential values of the steering angle phase differences is calculated as a product of the correction coefficient Kc and the integrated value Δθhi in accordance with the following Formula 9.

$$\Delta\theta hia = Kc \times \Delta\theta hia \quad (9)$$

In step 780, a driving ability index value Iskill of the driver is calculated as a sum of the corrected integrated value Δθdia of the absolute values of the differential values of the steering angle differences and the corrected integrated value Δθhia of the absolute values of the differential values of the steering angle phase differences in accordance with the following Formula 10.

$$Iskill = \Delta\theta dia + \Delta\theta hia \quad (10)$$

As is apparent from the above, in step 100, a target steered angle θlkt of the LKA control is calculated; when the selection switch 76 is ON, in step 200, an affirmative decision is made; and the LKA control is executed in steps 400-700.

Especially, in step 400, a driving ability index value Iskill which indicates the driving ability of the driver is calculated and in step 500, gains Ksr, Ksy and Ksh are variably set so that they gradually decrease within the positive range as a driving ability index value Iskill increases.

Consequently, according to the first embodiment, when driving ability of the driver is higher, the control amount of steered angle of the front wheels of the LKA control can be reduced, which lowers the tracking of the vehicle to the target trajectory in the LKA control. Accordingly, it is possible to reduce the possibility that alteration of steered angle of the front wheels by a driver is impeded by the steered angle control of the front wheels by the LKA control, which enables to reduce the possibility that a driver having higher driving ability feels dissatisfaction in driving a vehicle on his own initiative even in the event when the LKA control is executed.

By contrast, when driving ability of the driver is lower, the control amount of steered angle of the front wheels of the LKA control can be increased, which enhances the tracking of the vehicle to the target trajectory. Accordingly, it is possible to increase the possibility that the LKA control makes the vehicle travel along the target travel trajectory even in the event where steering operation is not properly conducted by a driver, which enables to make the vehicle travel along the target travel trajectory by the LKA control even in the case where a driver having lower driving ability drives a vehicle.

According to the first embodiment, a driving ability index value Iskill which indicates the driving ability of the driver is calculated in accordance with the flowchart shown in FIG. 4 and gains Ksr, Ksy and Ksh are automatically variably set in accordance with the driving ability index value Iskill. Therefore, the tracking of the vehicle to the target trajectory can automatically be modified without requiring operation of switches and the like by a driver.

Second Embodiment

Figure 15:
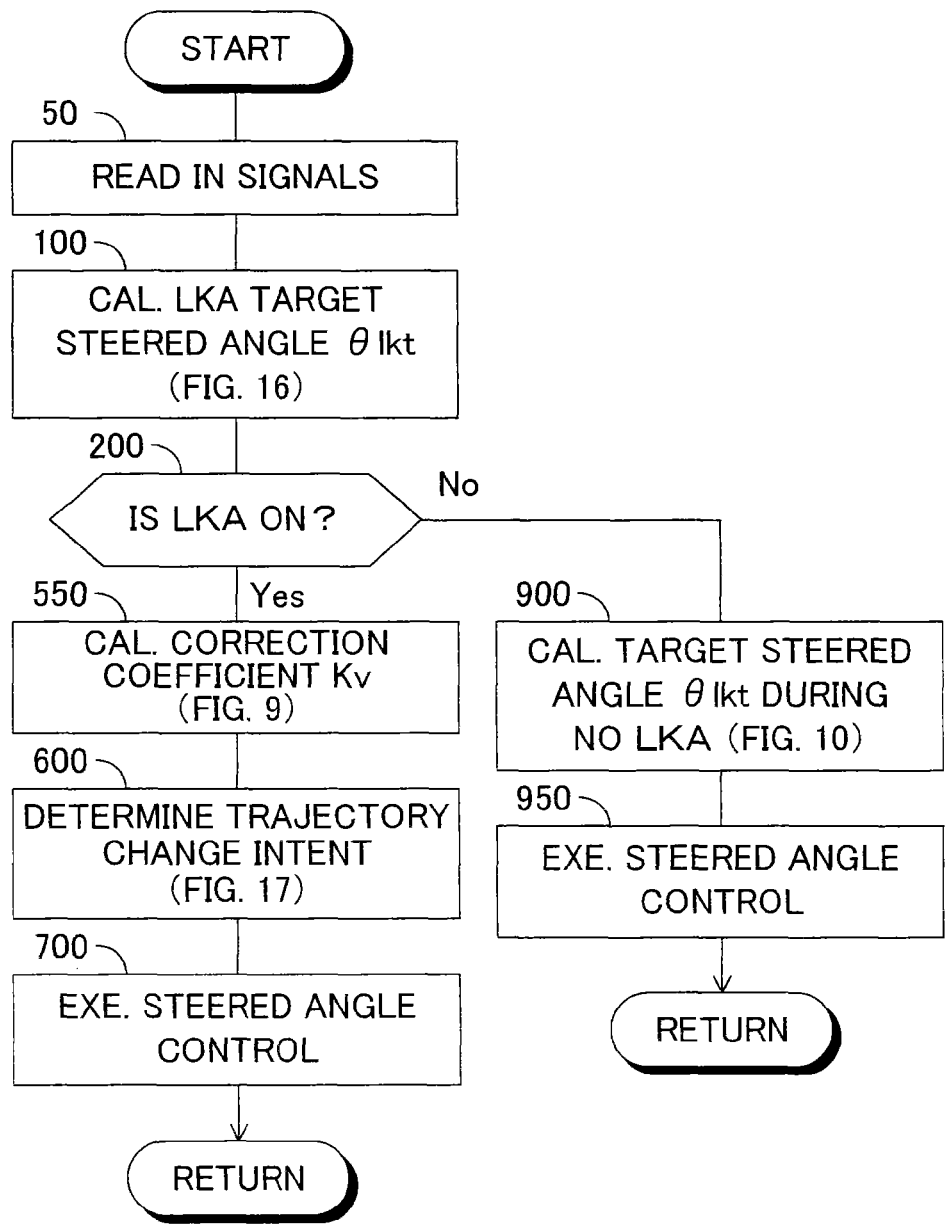
FIG. 15 is a flowchart showing a control routine of the steered angle of the front wheels in the second embodiment of a vehicle travel trajectory control device according to the present invention.

FIG. 15 is a flowchart showing a routine for controlling steered angle of the front wheels in the second embodiment of a vehicle travel trajectory control device according to the present invention. In FIG. 15, the same steps as those shown in FIG. 2 are denoted by the same step numbers as in FIG. 2. The same goes for the third embodiment described later.

Figure 16:
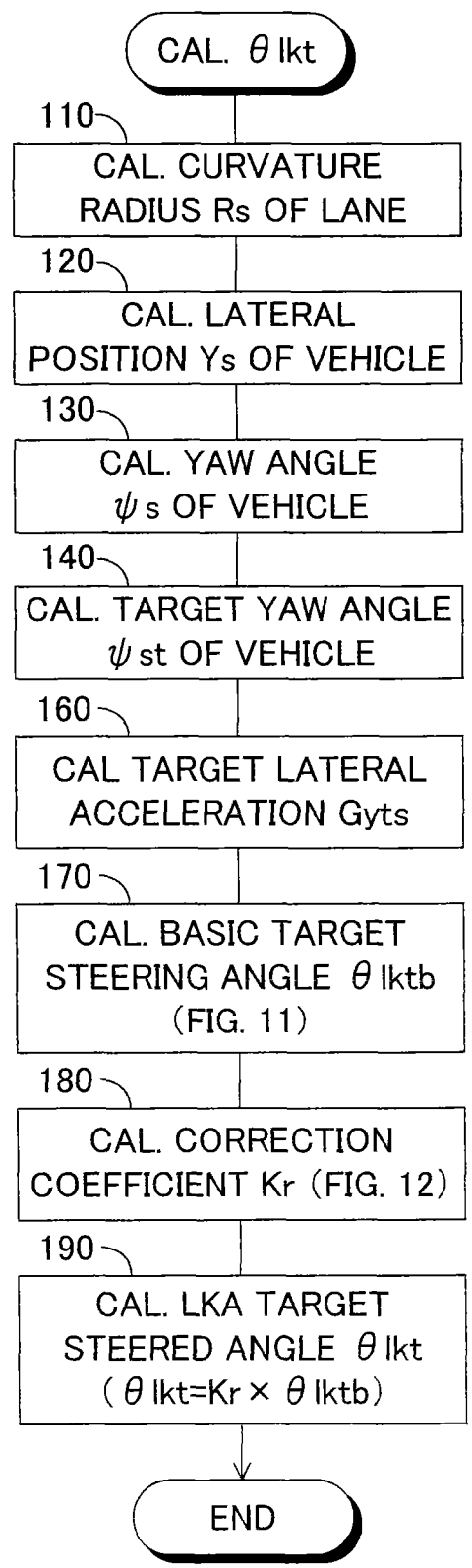
FIG. 16 is a flowchart showing a routine for calculating a target steered angle θlkt of the LKA control which is conducted in step 100 shown in FIG. 15.

In the second embodiment, step 100 is conducted in accordance with the flowchart shown in FIG. 16. It is to be noted that steps 110-140 and steps 170-190 in the flowchart shown in FIG. 16 are conducted in the similar manner as in the associated steps in the above-described first embodiment.

Figure 3:
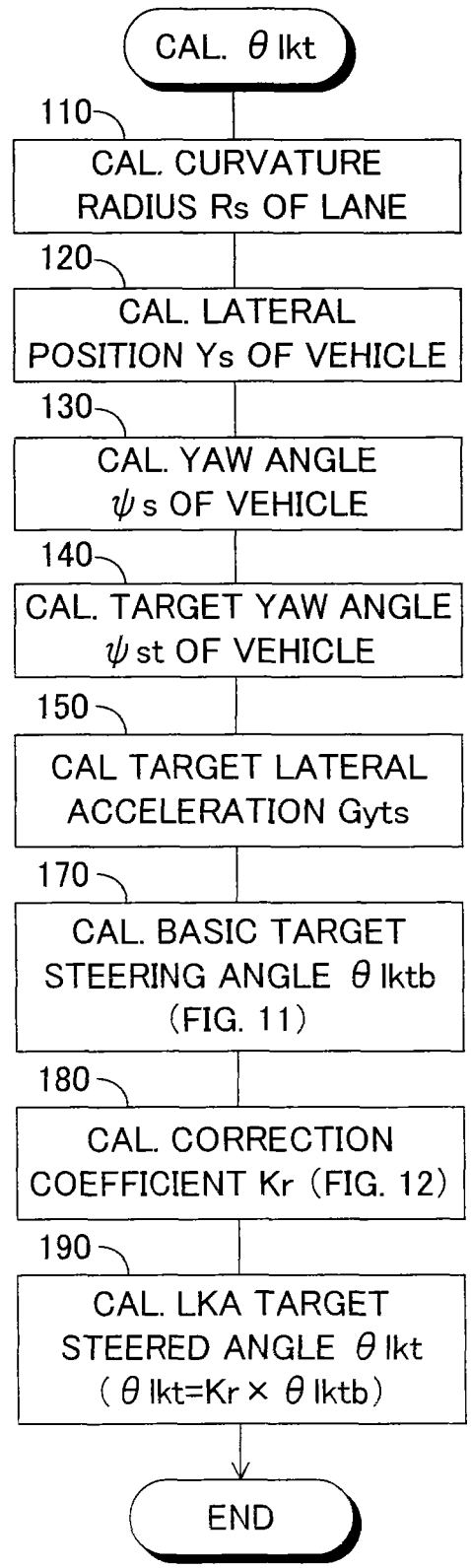
FIG. 3 is a flowchart showing a routine for calculating a target steered angle θlkt of the LKA control which is conducted in step 100 shown in FIG. 2.

As is apparent from comparing FIGS. 16 and 3, after completion of step 140, step 160 is conducted in place of step 150. In step 160, a target lateral acceleration Gyts of the vehicle for making the vehicle travel along the target trajectory which passes through the center of the lane is calculated in accordance with the following Formula 11 utilizing target lateral position adjustment amount ΔYdajt which was calculated in step 600 in the previous cycle. It is to be noted that at the time of starting the control, target lateral position adjustment amount ΔYdajt is set to 0 and gains Ksr, Ksy and Ksh are default values thereof stored in ROM.

$$Gyts = Ksr \times Rs + Ksy(Yst + \Delta Ydajt - Ys) + Ksh(\phi st - \phi s) \quad (11)$$

In the second embodiment, the steps other than steps 400, 500 and 800 in the first embodiment are not conducted, and, after completion of step 550, step 600 is conducted prior to step 700. In step 600, a determination as to whether the driver has a trajectory change intent is made in accordance with the flowchart shown in FIG. 17 and a target lateral position adjustment amount ΔYdajt for achieving trajectory change intended by the driver is calculated.

Since a driving ability index value Iskill of the driver is not calculated, in step 900, a correction coefficient Kvsk based on vehicle speed is calculated from a map shown in two-dot line in FIG. 10 on the basis of a vehicle speed V only.

Next, referring to the flowchart shown in FIG. 17, will be explained a routine for calculating a target lateral position adjustment amount ΔYdajt which is conducted in the above-mentioned step 600.

In step 610, a decision is made as to whether or not the driver has a trajectory change intent. When a negative decision is made, the control conducted in accordance with the flowchart shown in FIG. 17 is ceased, while when an affirmative decision is made, the control proceeds to step 620. Notably, when a situation continues for a time not less than a reference duaration time Twill (a positive constant) where the absolute value of the difference θ−θlkt between a target steering angle θlkt and steering angle θ is not less than a reference value θwii (a positive constant), it may be determined that the driver has a trajectory change intent.

In step 620, an index value Iwill indicating the intensity of a trajectory change intent of the driver is calculated. For example, with duration time of a situation being represented by ΔT where the absolute value of the difference θ−θlkt between a target steering angle θlkt and steering angle θ is not less than a reference value θwii, an index value Iwill is calculated as an integrated value of a product of the absolute value of the difference θ−θlkt and the duration time ΔT in accordance with the following Formula 12.

$$I\text{will}=\int(|\theta-\theta lkt|\Delta T)dt \quad (12)$$

Figure 18:
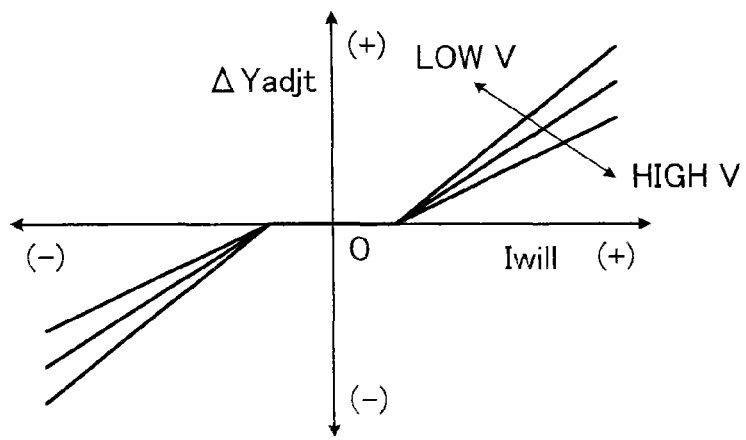
FIG. 18 is a flowchart showing a routine for calculating a target lateral position adjustment amount ΔYdajt for changing the target trajectory in response to driver's demand on the basis of the index value Mill indicating the intensity of a trajectory change intent of the drive and a vehicle speed V.

In step 630, a target lateral position adjustment amount ΔYdajt for changing the target trajectory in response to the driver's demand is calculated from a map shown in FIG. 18 on the basis of the index value Iwill indicating the intensity of a trajectory change intent of the driver and a vehicle speed V.

In step 640, the target lateral position adjustment amount ΔYdajt is processed by guard processing so that change rate of the target lateral position adjustment amount ΔYdajt does not exceed a predetermined value and the magnitude of the target lateral position adjustment amount ΔYdajt does not exceed a limit value which is determined by the width of the lane.

In step 650, the processed target lateral position adjustment amount ΔYdajt is stored by writing it into EEPROM for preparing calculation of a target lateral acceleration Gyts of the vehicle in step 160 in the next cycle.

Thus, according to the second embodiment, in step 600, a decision as to whether or not the driver has a trajectory change intent is made and a target lateral position adjustment amount ΔYdajt for achieving trajectory change intended by the driver is calculated. In steps 620 and 630, an index value Iwill indicating the intensity of a trajectory change intent of the driver and a target lateral position adjustment amount ΔYdajt for changing the target trajectory in response to the driver's demand, respectively, are calculated. In addition, in step 160, a target lateral acceleration Gyts of the vehicle for making the vehicle travel along the target trajectory which passes through the center of the lane is calculated.

In step 600, when a situation continues for a time not less than a reference continuation time Twill where the absolute value of the difference θ−θlkt between a target steering angle θlkt and steering angle θ is not less than a reference value θwii, it may be determined that the driver has a trajectory change intent. According to this determining method, when the driver has a trajectory change intent, it is possible to decide the fact without fail.

According to the second embodiment, when the driver has a trajectory change intent, vehicle lateral position control amount of the LKA control can be varied in accordance with the intensity of the intent, which enables to vary the tracking of the vehicle to the target trajectory in the LKA control.

For example, when the driver has an intensive trajectory change intent, vehicle lateral position control amount of the LKA control can be reduced, which lowers the tracking of the vehicle to the target trajectory in the LKA control. Accordingly, it is possible to reduce the possibility that alteration of vehicle trajectory by the steering operation by a driver is impeded by the steered angle control of the front wheels by the LKA control, which enables to reduce the possibility that a driver feels dissatisfaction about alteration of vehicle trajectory even in the event where the LKA control is executed.

By contrast, when the driver has a weak trajectory change intent, the control amount of steered angle of the front wheels of the LKA control can be increased, which enhances the tracking of the vehicle to the target trajectory. Accordingly, it is possible to increase the possibility that the LKA control makes the vehicle travel along the target travel trajectory even in the event where steering operation is not properly conducted by the driver, which enables to make the vehicle travel along the target travel trajectory by the LKA control even in the case where a driver does not positively make steering operation.

Figure 17:
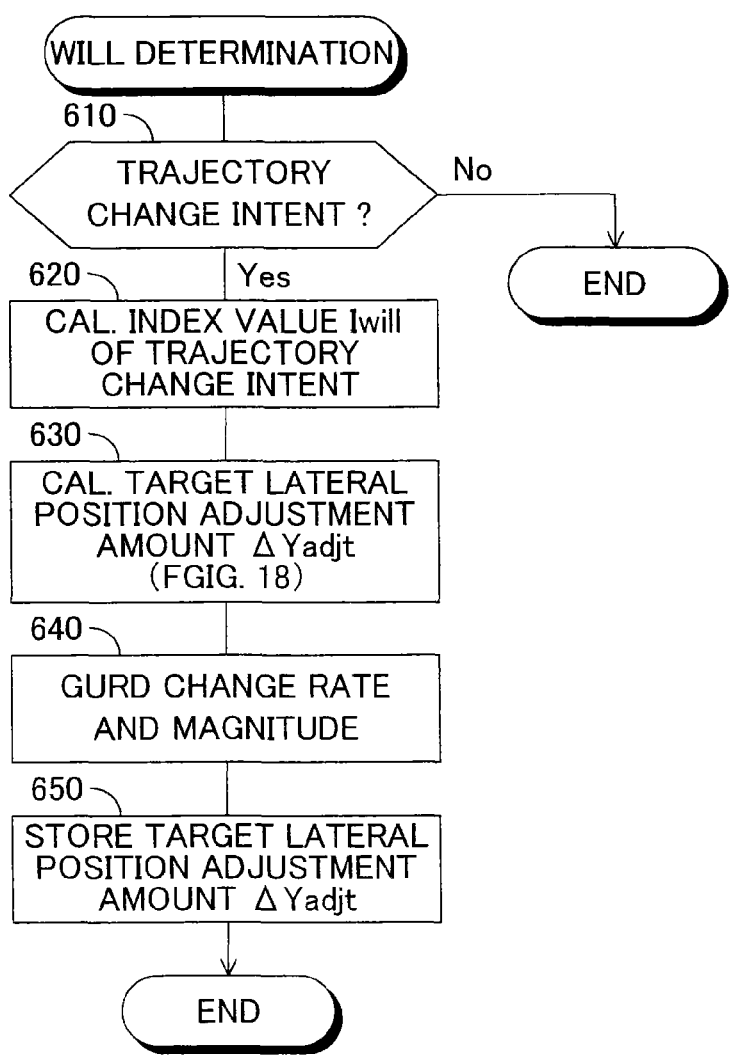
FIG. 17 is a flowchart showing a routine for calculating target lateral position adjustment amount ΔYdajt for achieving trajectory change intended by the driver which is conducted in step 600 shown in FIG. 15.

According to the second embodiment, an index value Iwill indicating the intensity of a trajectory change intent of the driver is calculated in accordance with the flowchart shown in FIG. 17 and a target lateral position adjustment amount ΔYdajt for changing the target trajectory is automatically variably set in accordance with the index value Iwill. Therefore, the tracking of the vehicle to the target trajectory can automatically be modified without requiring operation of switches and the like by a driver.

Third Embodiment

Figure 19:
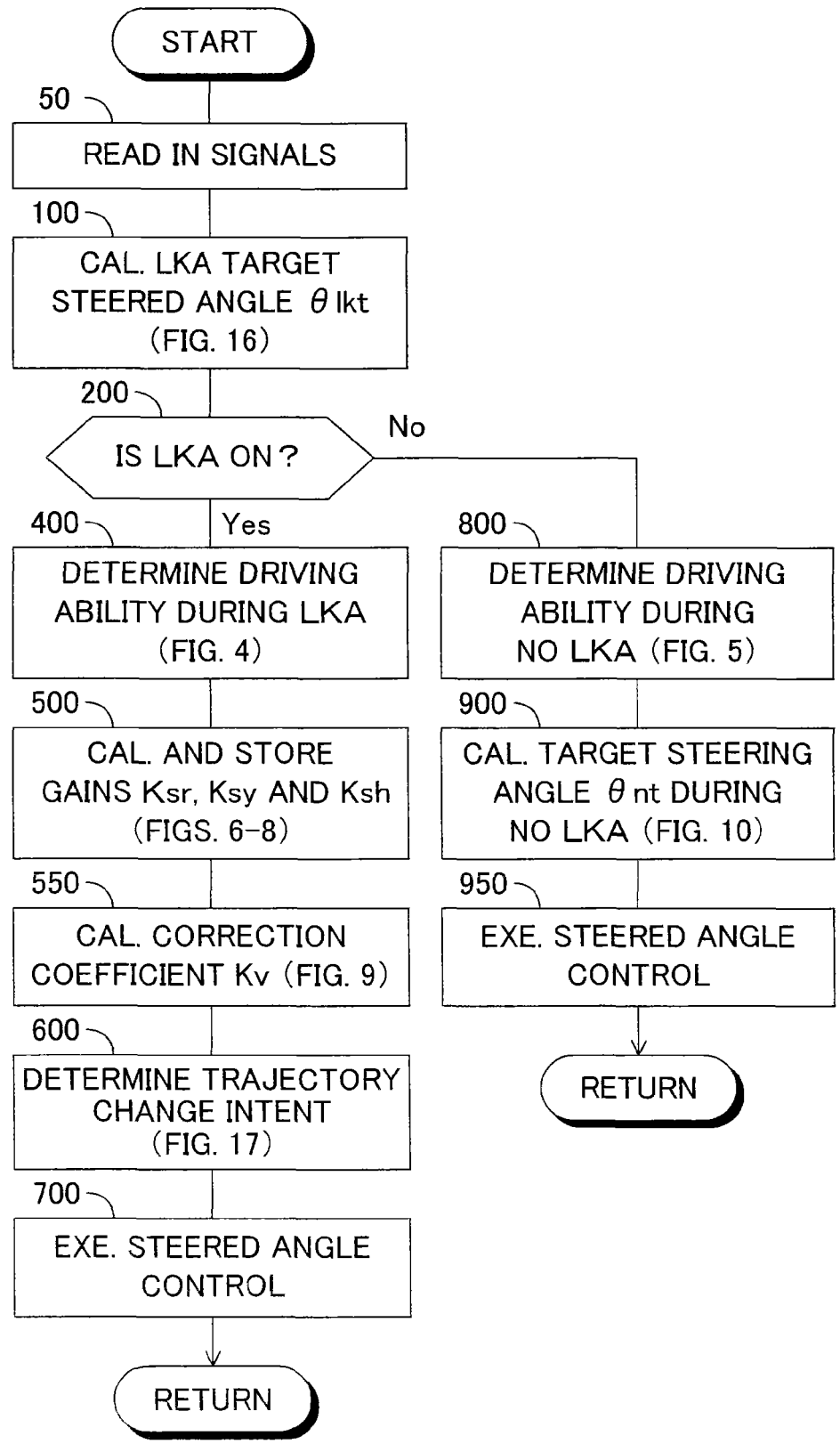
FIG. 19 is a flowchart showing a control routine of the steered angle of the front wheels in the third embodiment of a vehicle travel trajectory control device according to the present invention.

FIG. 19 is a flowchart showing a routine for controlling steered angle of the front wheels in the third embodiment of a vehicle travel trajectory control device according to the present invention.

In the third embodiment, as in the second embodiment, step 100 is conducted in accordance with the flowchart shown in FIG. 16. In step 160, however, gains Ksr, Ksy and Ksh in Formula 11 are the values which were stored in EEPROM in step 500 in the previous cycle.

As in the first embodiment, steps 400, 500 and 800 are conducted and as in the second embodiment, after completion of step 550, step 600 is conducted prior to step 700.

Thus, according to the third embodiment, the same effects as in the above-mentioned first and second embodiment can be obtained, resulting in that the tracking of the vehicle to the target trajectory in the LKA control can preferably be modified in accordance with both the driving ability of a driver and the intensity of trajectory change intent of a driver.

Notably, in the above-mentioned embodiments, the magnitude of the change rate in changing the tracking of the vehicle to the target trajectory in the LKA control is not referred to and may be constant irrespective of vehicle speed V. The change rate, however, may be variably set in accordance with a vehicle speed V so that when a vehicle speed V is high, the change rate is smaller as compared to where a vehicle speed V is low. According to the latter configuration, the tracking of the vehicle can be changed without delay when a vehicle speed V is low and the possibility can be reduced that the travel stability of the vehicle lowers due to the change in the tracking of the vehicle when a vehicle speed V is high.

When the mode is changed from the control mode to the non-control mode, the responsiveness of the steering control device 14 (particularly steering gear ratio of the steered angle varying device 30) which corresponds to the tracking of the vehicle may be stored. The responsiveness of the steering control device 14 may be controlled on the basis of the stored responsiveness when the vehicle continues to travel in the non-control mode. According to this configuration, in a situation where the vehicle continues to travel in the non-control mode after the mode was changed from the control mode to the non-control mode, the possibility can be reduced that a driver feels a sense of incongruity about the tracking of the vehicle in response to his or her steering operation.

When the vehicle finishes traveling in the non-control mode, the responsiveness of the steering control device 14 may be stored and the responsiveness of the steering control device 14 may be set to the stored responsiveness when the vehicle starts traveling in the non-control mode. According to this configuration, as compared to where the responsiveness of the steering control device 14 is reset and is not stored when the vehicle finishes traveling, the possibility can be reduced that a driver feels a sense of incongruity about the tracking of the vehicle in response to his or her steering operation when the vehicle starts traveling.

According to the above-mentioned first and third embodiments, in particular, driving ability of the driver during the LKA control is determined and a driving ability index value Iskill which indicates the driving ability of the driver is calculated in accordance with the flowchart shown in FIG. 4. The driving ability index value Iskill is calculated as a sum of the corrected integrated value $\Delta Y\mathrm{dia}$ of the absolute values of the differential values of the lateral position differences of the vehicle and the corrected integrated value $\Delta\phi\mathrm{dia}$ of the absolute values of the differential values of the yaw angle differences of the vehicle.

In general, when a driver has the high driving ability, a differential value $\Delta Yd$ of the difference between lateral position Ys of the vehicle and estimated lateral position Yest of the vehicle is not large in magnitude. By contrast, when a driver has the low driving ability, a differential value $\Delta Yd$ of the difference tends to be large in magnitude. In similar, when a driver has the high driving ability, a differential value $\Delta\phi d$ of the difference between yaw angle $\phi s$ of the vehicle and estimated yaw angle $\phi\mathrm{est}$ of the vehicle is not large in magnitude. By contrast, when a driver has the low driving ability, a differential value $\Delta\phi d$ of the difference tends to be greater in magnitude.

According to the above-mentioned first and third embodiments, a driving ability index value Iskill during the LKA control being executed is calculated on the basis of both a corrected integrated value $\Delta Y\mathrm{dia}$ and a corrected integrated value $\Delta\phi\mathrm{dia}$. Accordingly, driving ability of a driver can preferably be determined during the LKA control being executed as compared to where a driving ability index value Iskill is calculated on the basis of one of a corrected integrated value $\Delta Y\mathrm{dia}$ and a corrected integrated value $\Delta\phi\mathrm{dia}$.

It is to be noted that a driving ability index value Iskill may be calculated as either of a corrected integrated value $\Delta Y\mathrm{dia}$ of the absolute values of the differential values of vehicle lateral position differences or a corrected integrated value $\Delta\phi\mathrm{dia}$ of the absolute values of the differential values of vehicle yaw angle differences. A driving ability index value Iskill may be calculated taking account of integrated value of the absolute values of the differences between a target steering angle $\theta\mathrm{lkt}$ and an actual steering angle $\theta$.

According to the above-mentioned first and third embodiments, a driving ability index value Iskill is calculated on the basis of a weighted sum of a corrected integrated value $\Delta Y\mathrm{dia}$ and a corrected integrated value $\Delta\phi\mathrm{dia}$. When curvature radius of a lane is large, the weight of corrected integrated value $\Delta\phi\mathrm{dia}$ which is a first driving ability determination value is increased as compared to where the curvature radius of the lane is small. Accordingly, a driving ability index value Iskill can be calculated placing more importance on a corrected integrated value $\Delta Y\mathrm{dia}$ when the curvature radius of the lane is large, and can be calculated placing more importance on a corrected integrated value $\Delta\phi\mathrm{dia}$ when curvature radius of the lane is small. Consequently, driving ability of a driver can preferably be determined as compared to where weights of a corrected integrated value $\Delta Y\mathrm{dia}$ and a corrected integrated value $\Delta\phi\mathrm{dia}$ are constant irrespective of curvature radius magnitude of a lane.

According to the above-mentioned first and third embodiments, in step 410, estimated lateral position Yest of the vehicle relative to the reference position of a lane and estimated yaw angle $\phi\mathrm{est}$ of the vehicle relative to the lane are calculated on the basis of the target steered angle $\theta\mathrm{lkt}$ as values which are not affected by steering operation of a driver. In steps 420 and 480, a driving ability index value Iskill of a driver is calculated on the basis of the estimated lateral position Yest of the vehicle and estimated yaw angle $\phi\mathrm{est}$ of the vehicle relative to the lane. Therefore, driving ability of a driver can preferably be determined without the influences of fluctuation and the like caused by the LKA control.

According to the above-mentioned first and third embodiments, a driving ability index value Iskill which indicates the driving ability of a driver is calculated by determining the driving ability of the driver during no LKA control being executed in accordance with the flowchart shown in FIG. 5. The driving ability index value Iskill is calculated as a sum of a corrected integrated value $\Delta Y\mathrm{dia}$ of the differential values of the vehicle lateral position differences and a corrected integrated value $\Delta\phi\mathrm{dia}$ of the differential values of the vehicle yaw angle differences.

In general, when a driver has the high driving ability, a differential value $\Delta\theta d$ of the difference between a target steering angle $\theta\mathrm{lkt}$ of the vehicle travel trajectory control and an actual steering angle $\theta$ is not large in magnitude. By contrast, when a driver has the low driving ability, a differential value $\Delta\theta d$ of the difference tends to be large in magnitude. In similar, when a driver has the high driving ability, a differential value $\Delta\theta h$ of the phase difference between a target steering angle $\theta\mathrm{lkt}$ and an actual steering angle $\theta$ is not large in magnitude. By contrast, when a driver has the low driving ability, a differential value $\Delta\theta h$ of the phase difference tends to be greater in magnitude. Consequently, according to the above-mentioned first and third embodiment, driving ability of a driver can preferably be determined during no LKA control being executed.

According to the above-mentioned first and third embodiments, a driving ability index value Iskill during no LKA control being executed is calculated on the basis of both a corrected integrated value $\Delta\theta\mathrm{dia}$ and a corrected integrated value $\Delta\theta\mathrm{hia}$. Accordingly, driving ability of a driver can preferably be determined during no LKA control being executed as compared to where a driving ability index value Iskill is calculated on the basis of one of a corrected integrated value $\Delta\theta\mathrm{dia}$ and a corrected integrated value $\Delta\theta\mathrm{hia}$.

It is to be noted that a driving ability index value Iskill may be calculated as either of a corrected integrated value $\Delta\theta\mathrm{dia}$ of the differential values of steering angle differences or a corrected integrated value $\Delta\theta\mathrm{hia}$ of the differential values of steering phase differences. A driving ability index value Iskill may be calculated taking account of an integrated value of the absolute values of the differences between a target steering angle $\theta\mathrm{lkt}$ and a steering angle $\theta$.

According to the above-mentioned first and third embodiments, a driving ability index value Iskill is calculated on the basis of a weighted sum of a corrected integrated value ΔΘdia and a corrected integrated value ΔΘhia. When curvature radius of a lane is large, the weight of the corrected integrated value ΔΘhia which is a third driving ability determination value is increased as compared to where the curvature radius of the lane is small. Accordingly, a driving ability index value Iskill can be calculated placing more importance on a corrected integrated value ΔΘdia when the curvature radius of the lane is large, and can be calculated placing more importance on a corrected integrated value ΔΘhia when the curvature radius of the lane is small. Consequently, driving ability of a driver can preferably be determined as compared to where weights of a corrected integrated value ΔΘdia and a corrected integrated value ΔΘhia are constant irrespective of curvature radius magnitude of a lane.

According to the above-mentioned first and third embodiments, when the LKA control is not executed, in step 900, a correction coefficient Kvsk is calculated on the basis of a vehicle speed V and a driving ability index value Iskill and in step 950, a target pinion angle φnt is calculated as a product of the correction coefficient Kvsk and steering angle θ. Consequently, in a situation where the LKA control is not executed, when a driving ability index value Iskill is large, steering gear ratio can be lowered as compared to where the driving ability index value Iskill is small.

Therefore, when a driver has the high driving ability, steering gear ratio can be decreased to enhance the responsiveness in changing steered angle of the front wheels in response to steering operation of a driver, which enables to reduce the possibility that the driver feel dissatisfaction. By contrast, when a driver has the low driving ability, steering gear ratio can be increased to restrain steered angle of the front wheels from being unnecessarily changed due to improper steering operation of a driver, which enables to enhance vehicle travel stability when the LKA control is not executed.

In the above-mentioned second and third embodiments, a driving ability index value Iskill which indicates the driving ability of the driver is calculated as an integrated value of the absolute values of the differences θ−θlkt between a target steering angle θlkt and steering angle θ. However, a driving ability index value Iskill may, for example, be calculated as an integrated value of the absolute values of the vehicle lateral position differences or a sum of an integrated value of the absolute values of the steering angle differences and an integrated value of the absolute values of the vehicle lateral position differences.

While the present invention has been described with reference to the above embodiments, it will be apparent to those skilled in the art that the present invention is not limited thereto, but may be embodied in various other forms without departing from the scope of the invention.

For example, in the above-described embodiments, a target lateral acceleration Gyts of the vehicle for making the vehicle travel along a target trajectory is calculated on the basis of curvature radius Rs of a lane, lateral position Ys of the vehicle relative to a reference position of the lane and yaw angle φs of the vehicle relative to the lane. A target steered angle θlkt of the LKA control is calculated on the basis of the target lateral acceleration Gyts. However, any one of curvature radius Rs of a lane, lateral position Ys of the vehicle relative to a reference position of the lane and yaw angle φs of the vehicle relative to the lane may be omitted and a target steered angle θlkt of the LKA control may be calculated in another manner.

In the above-described first and third embodiments, in step 500, all the gains Ksr, Ksy and Ksh which are utilized in calculating a target steered angle θlkt are variably set in accordance with a driving ability index value Iskill. However, only one or two of the gains Ksr, Ksy and Ksh may be variably set in accordance with a driving ability index value Iskill.

In the above-described first to third embodiments, even when the LKA control is not executed, a driving ability index value Iskill is calculated; a correction coefficient Kvsk is calculated on the basis of the driving ability index value Iskill; and steering gear ratio is controlled in accordance with the driving ability index value Iskill. However, calculation of a driving ability index value Iskill during no LKA control being executed may be omitted and steering gear ratio may variably be set only in accordance with a vehicle speed V.

The invention claimed is:

1. A travel trajectory control device for a vehicle which executes a vehicle travel trajectory control comprising:
   circuitry configured to:
      calculate a target steered angle of steered wheels for making a vehicle travel to track a target trajectory;
      control a steered angle of the steered wheels on the basis of the target steered angle with a steered angle varying device independently of a presence of a steering operation of a driver;
      determine at least one of a driving ability of the driver and a trajectory change intent of the driver during execution of the vehicle travel trajectory control; and
      variably set tracking of the vehicle to the target trajectory in accordance with a result of the determination by varying a gain of the vehicle travel trajectory control on a basis of the result of the determination,
   wherein the circuitry is further configured to:
      determine the driving ability of the driver on the basis of a change rate of a difference between an actual travel parameter reflecting the steering operation of the driver and a target travel parameter for making the vehicle travel to track the target trajectory;
      determine the driving ability of the driver on a basis of a weighted sum of a first driving ability determination value based on a change rate of a difference of lateral positions of the vehicle and a second driving ability determination value based on a change rate of a difference of yaw angles of the vehicle; and
      when a curvature radius of a lane is large, increase the weight of the first driving ability determination value, as compared to where the curvature radius of the lane is small.

2. The travel trajectory control device for a vehicle according to claim 1, wherein the circuitry is configured to, when the driver has a high driving ability, set the tracking of the vehicle to the target trajectory lower by reducing the gain of the vehicle travel trajectory control, as compared to where the driver has a low driving ability.

3. The travel trajectory control device for a vehicle according to claim 1, wherein the circuitry is configured to, when the driver has an intensive trajectory change intent, set the tracking of the vehicle to the target trajectory lower by reducing the gain of the vehicle travel trajectory control, as compared to where the driver has a weak trajectory change intent.

4. The travel trajectory control device for a vehicle according to claim 1, wherein the circuitry is configured to make the determination as to whether or not the driver has the trajectory change intent on a basis of a duration time for which a magnitude of a difference between an actual travel parameter reflecting the steering operation of the driver and a target travel parameter for making the vehicle travel to track the target trajectory is not less than a reference value.

5. The travel trajectory control device for a vehicle according to claim 4, wherein the circuitry is configured to determine an intensity of the trajectory change intent of the driver on a basis of a product of the magnitude of the difference and the duration time in a situation where it is determined that the driver has the trajectory change intent.

6. The travel trajectory control device for a vehicle according to claim 1, wherein the circuitry is configured to:
estimate at least one of travel trajectory parameters which are lateral position of the vehicle relative to a lane, curvature radius of the lane, and a yaw angle of the vehicle relative to the lane on a basis of information of the lane; and
calculate the target steered angle of the steered wheels on the basis of the at least one of the travel trajectory parameters.

7. The travel trajectory control device for a vehicle according to claim 1, wherein the circuitry is configured to use the target travel parameter from which an influence of the travel trajectory control is eliminated.

8. The travel trajectory control device for a vehicle according to claim 1, wherein the circuitry is configured to, when a vehicle speed is high, decrease a change rate in changing the tracking of the vehicle, as compared to where a vehicle speed is low.

9. A travel trajectory control device for a vehicle which executes a vehicle travel trajectory control comprising:
circuitry configured to:
calculate a target steered angle of steered wheels for making a vehicle travel to track a target trajectory;
control a steered angle of the steered wheels on the basis of the target steered angle with a steered angle varying device independently of a presence of a steering operation of a driver;
determine at least one of a driving ability of the driver and a trajectory change intent of the driver during execution of the vehicle travel trajectory control, and
variably set tracking of the vehicle to the target trajectory in accordance with a result of the determination by varying a gain of the vehicle travel trajectory control on a basis of the result of the determination, wherein
the circuitry is further configured to:
determine the driving ability of the driver on the basis of a change rate of a difference between an actual travel parameter reflecting the steering operation of the driver and a target travel parameter for making the vehicle travel to track the target trajectory;
have a control mode in which the travel trajectory control is executed and a non-control mode in which the travel trajectory control is not executed; and
calculate the target steered angle of the steered wheels in the non-control mode,
the difference includes a difference between the target steered angle of the steered wheels and an actual steered angle of the steered wheels, and
the circuitry is configured to, in the non-control mode:
determine the driving ability of the driver on a basis of a weighted sum of a third driving ability determination value based on a difference of steered angles and a fourth driving ability determination value based on a phase difference between the target steered angle of the steered wheels and the actual steered angle of the steered wheels; and
when a curvature radius of a lane is large, increase the weight of the third driving ability determination value, as compared to where the curvature radius of the lane is small.

10. The travel trajectory control device for a vehicle according to claim 9, wherein
the steered angle varying device is configured to vary a responsiveness in varying the steered angle of the steered wheels in response to the steering operation of the driver, and
in the non-control mode, the circuitry is configured to variably set the responsiveness of the steered angle varying device in accordance the driving ability of the driver.

11. The travel trajectory control device for a vehicle according to claim 10, wherein the circuitry is configured to:
store the responsiveness of the steered angle varying device which corresponds to the tracking of the vehicle when the mode is changed from the control mode to the non-control mode; and
when the vehicle continues to travel in the non-control mode, control the responsiveness of the steered angle varying device on a basis of the stored responsiveness.

12. The travel trajectory control device for a vehicle according to claim 10, wherein the circuitry is configured to:
store the responsiveness of the steered angle varying device when the vehicle finishes traveling in the non-control mode; and
control the responsiveness of the steered angle varying device on a basis of the stored responsiveness when the vehicle starts traveling in the non-control mode.

* * * * *